Patented Feb. 18, 1936

2,031,529

UNITED STATES PATENT OFFICE 2,031,529

PROCESS FOR THE PREPARATION OF MERCAPTANS

Eberhard Elbel and Alfred Kirstahler, Dusseldorf, Germany, assignors to Henkel & Cie., Gesellschaft mit beschränkter Haftung, Dusseldorf, Germany No Drawing. Application March 14, 1933, Serial No. 660,775. In Germany April 4, 1932

1 Claim. (Cl. 260—156)

It has been found that hydroaromatic or higher aliphatic mercaptans or mixtures of such mercaptans may be made in a simple manner by treating hydroaromatic or high molecular aliphatic disulphides or polysulphides or their mixtures with reducing agents.

Such hydroaromatic or higher aliphatic disulphides or polysulphides are, for example, didodecyl disulphide, dicetyl trisulphide, dodecyltetradecyl disulphide, dicyclohexyl disulphide and the like compounds. These compounds are obtained for example by the reaction of the mineral acid esters of higher hydroxy compounds with alkali disulphides or alkali polysulphides.

The disulphides and polysulphides mentioned in the foregoing may also be substiuted by groups of any kind. Such groups are, for example, ether groups, carboxyl groups, sulpho groups, hydroxy groups, amino groups and the like. Also polyvalent disulphides of the type specified may be treated with equal success with reducing agents.

The known reducing agents may be employed as reducing agents. Thus, for example, it is possible to employ zinc dust in the presence of an alkaline or acid medium.

Water-soluble hydrosulphides, sulphides or polysulphides have been found to be particularly suitable for the reduction. In addition, there is the considerable advantage that the solutions of inorganic sulphides or polysulphides which are produced during the reaction may be employed again for the manufacture of the organic disulphides or polysulphides.

The mercaptans or mercaptan mixtures corresponding to the disulphides or polysulphides are formed in excellent yields during the reaction.

The mercaptans may be employed inter alia in the rubber industry, also in the pharmaceutical industry and the like. They also serve as starting substances for other conversion products.

Example 100 parts by weight of didodecyl disulphide are mixed with a 30-per cent. solution of 35 parts by weight of NaHS in water and heated to boiling for about 3 hours under a reflux condenser with vigorous stirring. The reaction mass consists of two layers; the oily layer is separated from the brown-colored aqueous layer, and is worked up to the pure mercaptan by known methods. The dodecyl mercaptan-1, which is fluid and boils at 142–145° C. (under a pressure of 15 millimetres) is obtained in an excellent yield.

It will be understood that by the terms "high molecular" or "higher molecular" as used in the following claim, compounds having at least eight carbon atoms in the molecule are intended to be covered.

We claim:

A process for the preparation of high molecular aliphatic mercaptans, which comprises treating didodecyl disulphide with NaHS.

EBERHARD ELBEL.
ALFRED KIRSTAHLER.